United States Patent [19]

Kreutzer, Jr. et al.

[11] Patent Number: 5,057,985
[45] Date of Patent: Oct. 15, 1991

[54] BI-DIRECTIONAL OSCILLABLE SIGNAL LIGHT

[75] Inventors: Robert E. Kreutzer, Jr., Columbia, Ill.; John S. Davis, Town & Country; Andrew G. Smith, Chesterfield, both of Mo.

[73] Assignee: Public Safety Equipment, Inc., St. Louis, Mo.

[21] Appl. No.: 563,293

[22] Filed: Aug. 6, 1990

[51] Int. Cl.⁵ .............................................. F21M 3/18
[52] U.S. Cl. .................................. 362/425; 362/287; 340/471
[58] Field of Search .................. 362/286, 428, 35, 425, 362/287; 340/471

[56] References Cited

U.S. PATENT DOCUMENTS

| | | | |
|---|---|---|---|
| 2,096,755 | 12/1932 | Parsberg | 177/352 |
| 2,409,046 | 6/1944 | Kennelly | 177/329 |
| 2,417,934 | 1/1945 | Kennelly | 177/329 |
| 2,510,892 | 2/1948 | Kennelly | 177/329 |
| 3,133,263 | 4/1960 | Norberg | 340/25 |
| 3,546,669 | 6/1969 | Kennelly | 340/84 |
| 4,281,311 | 6/1979 | Gosswiller | 340/81 |
| 4,387,362 | 5/1981 | Gosswiller | 340/81 |
| 4,388,609 | 6/1983 | Menke | 340/471 |
| 4,511,880 | 9/1983 | Stanuch | 340/84 |
| 4,530,037 | 6/1983 | Eggers | 362/35 |
| 4,701,743 | 10/1987 | Pearlman et al. | 362/35 |
| 4,930,057 | 5/1990 | Williams | 362/286 |

*Primary Examiner*—Carroll B. Dority
*Attorney, Agent, or Firm*—Senniger, Powers, Leavitt & Roedel

[57] ABSTRACT

A signal light comprising a base, a frame pivotally mounted on the base for pivoting about a first axis, and a bracket pivotally mounted in the frame for pivoting about a second axis, generally perpendicular to the first axis. A light source is mounted on the bracket so that it pivots with the frame and bracket about the first and second axes. The signal light includes apparatus for pivoting the light source about the first and second axes. This apparatus comprises a disc, having grooves forming first and second cam surfaces. The grooves are preferably located in opposite faces of the disc. A first cam follower follows the first cam surfaces and causes the frame to pivot. A second cam follower follows the second cam surface and causes the bracket to pivot.

25 Claims, 5 Drawing Sheets

BI-DIRECTIONAL OSCILLABLE SIGNAL LIGHT

BACKGROUND OF THE INVENTION

This invention relates to signal lights of the type used on emergency vehicles, and in particular to such signal lights that are oscillable in two directions.

Various lights that oscillate in two directions, for example in the horizontal and vertical directions, are known. The majority of these lights trace a simple, repetitive pattern, for example an "X" or a FIG. 8. Examples of such devices may be found in U.S. Pat. Nos. 2,409,046, 2,510,892, 4,511,880, and 4,530,037. These devices are usually unsatisfactory as signals because the beams of their lights do not sweep all areas within the perimeter of the pattern, resulting in substantial gaps or blind spots in the pattern. Another problem with these prior signal lights is that their mechanisms are usually extremely complicated. Another problem with these prior lights is that it is difficult to change the pattern that the light traces. Co-assigned U.S. Pat. No. 4,388,609, solves many of these problems, but does not provide all of the advantages of the present invention.

SUMMARY OF THE INVENTION

It is among the objects of the present invention to provide a signal light that is oscillable in the horizontal and vertical directions; to provide such a signal light that sweeps a pattern that provides substantial coverage of the area of illumination without significant gaps or blind spots; to provide such a signal light in which the bi-directional oscillation is smooth and continuous; to provide such a signal light in which the speed of the light is relatively constant; to provide such a signal light that is of simple and reliable construction, and in particular to provide such a signal light that can operate with a single drive motor; and to provide such a signal light in which the pattern the light traces can be easily changed.

Generally, the signal light of the present invention comprises a base, a light source, means for pivotally mounting the light source on the base to pivot about a first axis, and means for pivotally mounting the light source to Pivot about a second axis, generally perpendicular to the first axis. The signal light further comprises means for pivoting the light source about the first and second axes. This pivoting means comprises first and second moving cam surfaces, means following the first cam surface for pivoting the light source about the first axis, and means following the second cam surface for pivoting the light source about the second axis.

In the preferred embodiment the means for pivotally mounting the light about the first axis comprises a frame pivotally mounted on the base. The means for pivoting the light about the first axis comprises a first cam follower which engages the first moving cam surface, and means for operatively connecting the first cam follower and the frame so that movement of the follower causes the frame to pivot. The means for pivotally mounting the light about the second axis preferably comprises a bracket pivotally mounted in the frame. The means for pivoting the light about the second axis comprises a second cam follower, connected to the bracket, and adapted to follow the second cam surface. The first and second moving cam surfaces are preferably located on a disc, rotatably mounted on the base.

This device preferably causes the light to trace a repeating closed loop pattern. The movement of the light is smooth and jerk-free, and the speed of the motion of the signal light in each direction (horizontal and vertical) remains relatively constant. The first axis is preferably generally vertical and the second axis is preferably generally horizontal. The pattern is elongate in the horizontal direction, and characterized by substantially vertical movement of the light at the opposite horizontal ends of the pattern. The light preferably moves in a generally sinuous path as it moves horizontally from one end of the pattern to the other.

The signal light of the present invention provides a light that is oscillable in both the vertical and horizontal directions. The signal light sweeps a pattern that provides substantial coverage of the area of illumination without significant gaps or blind spots. The motion of the light is smooth, jerk-free, and the speed is relatively constant. The signal light is of simple and reliable construction, having just a single motor to oscillate the light in two directions. The pattern is easily changed by replacing the disc containing the first and second cam surfaces. Cam surfaces for new patterns can be quickly and easily designed, for example with the aid of a computer.

These and other advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
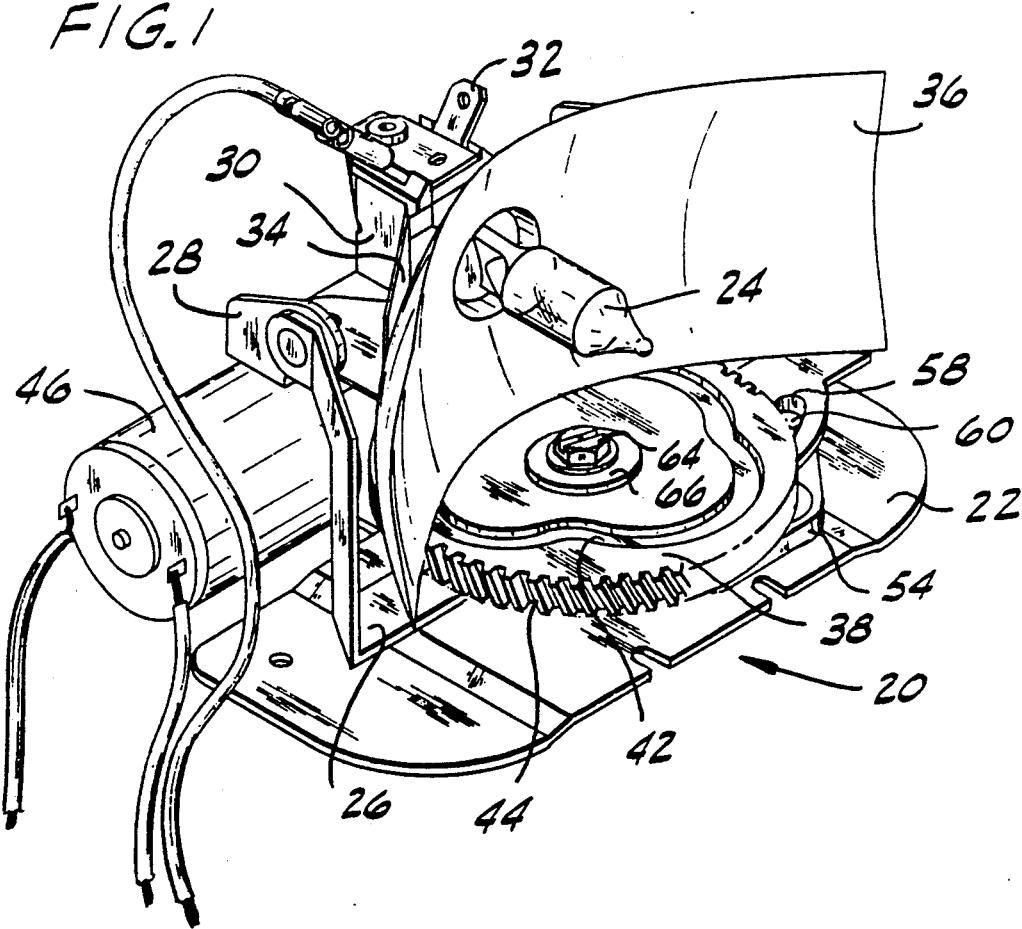
FIG. 1 is a perspective view of a signal light constructed according to the principles of this invention.

A signal light constructed according to the principles of this invention is indicated generally as 20 in FIG. 1. The signal light 20 comprises a base 22, a light source such as a lamp 24, and means for pivotally mounting the lamp on the base to pivot about a first axis, and means for pivotally mounting the lamp to pivot about a second axis, generally perpendicular to the first axis.

In this preferred embodiment the first axis is generally vertical and the second axis is generally horizontal. The means for mounting the lamp 24 to pivot about the first axis preferably comprises a generally U-shaped frame 26, pivotally mounted at the bottom of the "U" to the base 22. The means for mounting the lamp 24 to pivot about the second axis preferably comprises a bracket 28 which is pivotally mounted between the upstanding legs of the U-shaped frame 26. The bracket 28 supports a box-like socket 30 which supports and provides electrical power to the lamp 24. The socket 30 includes contacts 32 for connecting the socket 30 to a source of electric power. Wings 34 project from the front of the socket for mounting a parabolic reflector 36 for focusing the light from lamp 24.

The signal light 20 further comprises means for pivoting the lamp about the first and second axes. This means comprises first and second moving cam surfaces, means following the first cam surface for pivoting the lamp about the first axis, and means following the second cam surface for pivoting the lamp about the second axis.

Figure 2:
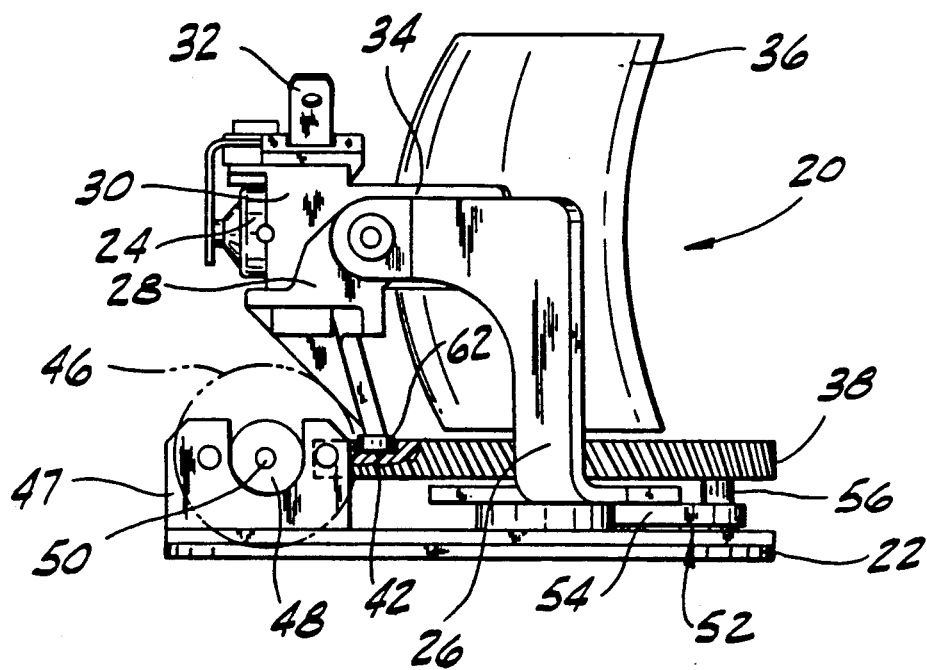
FIG. 2 is a left side elevation view of the signal light, with the driving motor shown in phantom.
Figure 3:
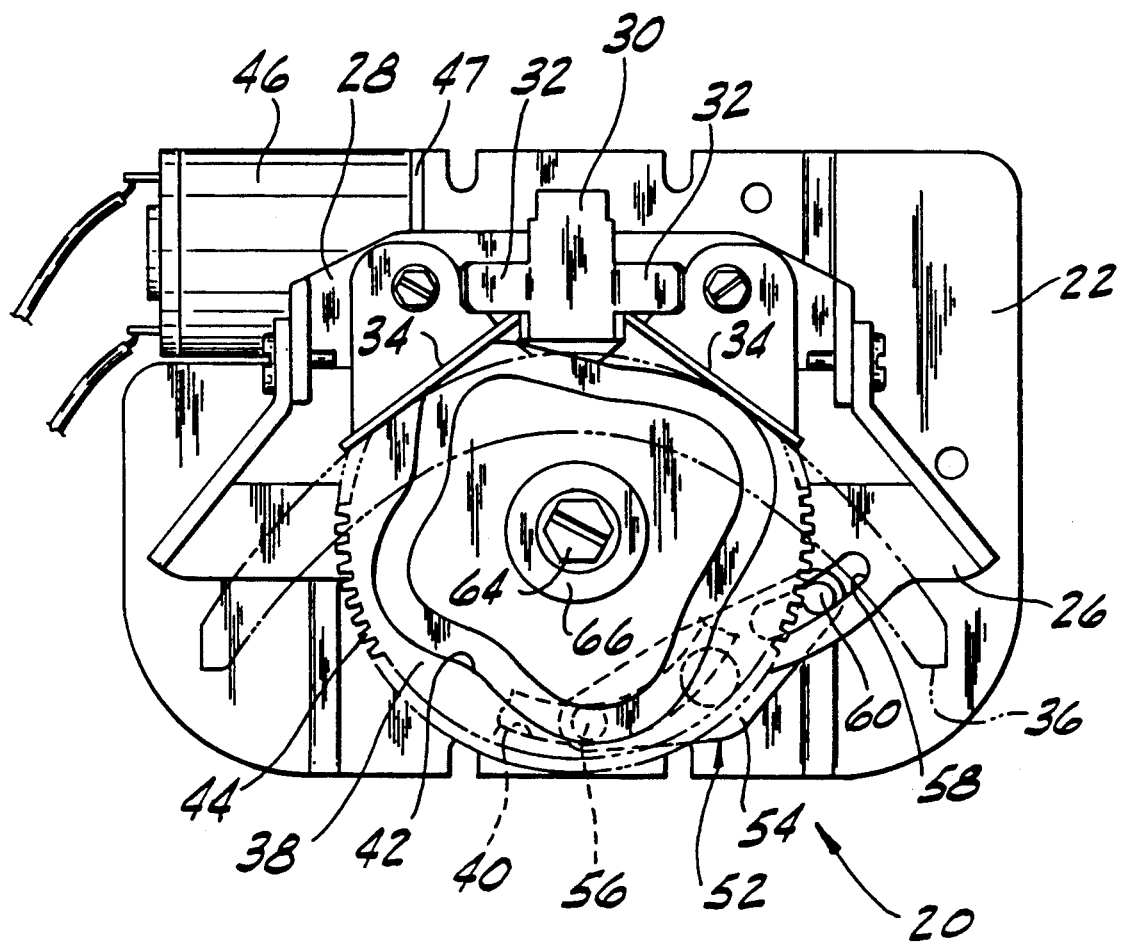
FIG. 3 is a top plan view of the signal light, with the lamp removed and the reflector shown in phantom.
Figure 4:
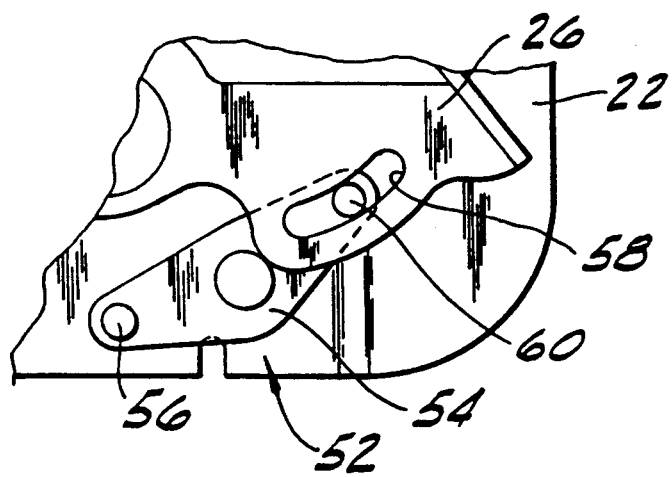
FIG. 4 is an enlarged partial plan view of the signal light, showing the connection between the first cam follower and the frame.
Figure 5:
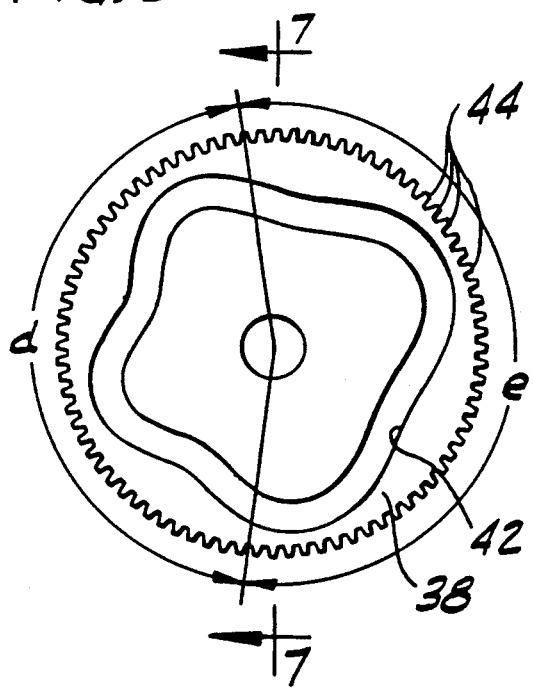
FIG. 5 is a top plan view of the disc, showing the second cam surface.
Figure 6:
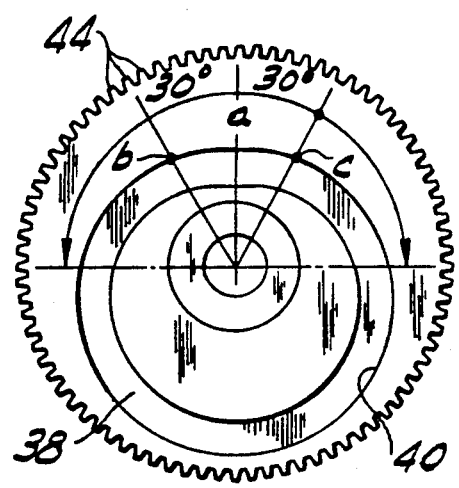
FIG. 6 is a bottom plan view of the disc, showing the first cam surface.
Figure 7:
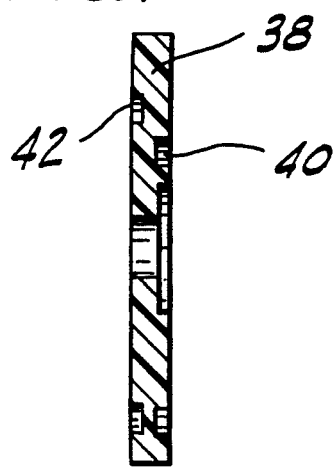
FIG. 7 is a cross-sectional view of the disc, taken along the plane of line 7—7 in FIG. 5.

In this preferred embodiment, the signal light includes a disc 38, rotatably mounted on the base 22, and first and second cam surfaces on the disc 38. As best shown in FIG. 6, the first cam surface comprises a groove 40 in the bottom surface of the disc 38. As best shown in FIG. 5, the second cam surface comprises a groove 42 in the top surface of the disc 38. The periphery of the disc has a plurality of teeth 44, which are preferably helical. As best shown in FIG. 2, an electric motor 46 is mounted on an upstanding bracket 47 formed integrally with the base 22, generally behind the frame 26. The disc 38 is driven by a worm 48 on the drive shaft 50 of the motor 46.

The means for pivoting the lamp 24 includes means following the first cam surface for pivoting the frame 26 about the first axis, and means following the second cam surface for pivoting the bracket 28 about the second axis. The means for pivoting the frame 26 about the first axis includes a first cam follower indicated generally as 52 which engages the first moving cam surface (the groove 40), and means for operatively connecting the first cam follower 52 and the frame 26 so that movement of the first cam follower 52 causes the frame 26 to pivot. The first cam follower preferably comprises a link 54, pivotally mounted on the base 22, having a portion 56 in engagement with the groove 40. The means for operatively connecting the first cam follower 52 to the frame 26 comprises a precisely configured accurate slot 58 in the frame, and a boss 60 on the link 54 that is slidable in the slot 58. The first cam surface (groove 40) causes the link 54 to pivot back and forth. The pivoting of the link 54 moves the boss 60 to pivot the frame 26. The slot 58 is configured to accommodate some lost motion between the boss 60 and the frame 26 so that the frame 26 turns smoothly and continuously in response to the generally rocking motion of the link 54.

The means for pivoting the bracket 28 about the second axis comprises a second cam follower 62, connected to the bracket, and adapted to follow the second cam surface (groove 42). The second cam surface causes the second cam follower 62, and thus the bracket 28, to pivot.

The groove 40 forming the first cam surface is adapted to cause the lamp 24 to sweep smoothly in the horizontal direction. As shown in FIG. 6, the portion a of the groove 40 was altered empirically in such a manner as to decrease the amount of backlash at one end of the frame's motion. This was accomplished by increasing the radial dimension of the groove sinusoidally, with maximum increases of 0.010 inches at ±30° (points b and c). The groove 42 forming the second cam surface is adapted to cause the lamp 24 to pivot up and down. The cam follower follows the portion d of the groove 42 as the light sweeps horizontally in one direction and the portion e of the groove 42 as the light sweeps horizontally in the other direction. Uniform vertical motion is achieved by causing the light to sweep through the same number of vertical cycles in each direction. The motion of the lamp is thus easily changed by changing the shape of the grooves 40 and 42, and particularly groove 42. This is most conveniently done by simply replacing the disc 38 with a new disc, with a new pattern of grooves. It should be apparent that virtually any light pattern can be achieved by correctly configuring the grooves 40 and 42. To this end the disc 38 is preferably releasably mounted with a screw 64 and washer 66 so that the disc is easily removed and replaced with another disc with a different set of grooves to change the pattern whenever desired.

Figure 8:
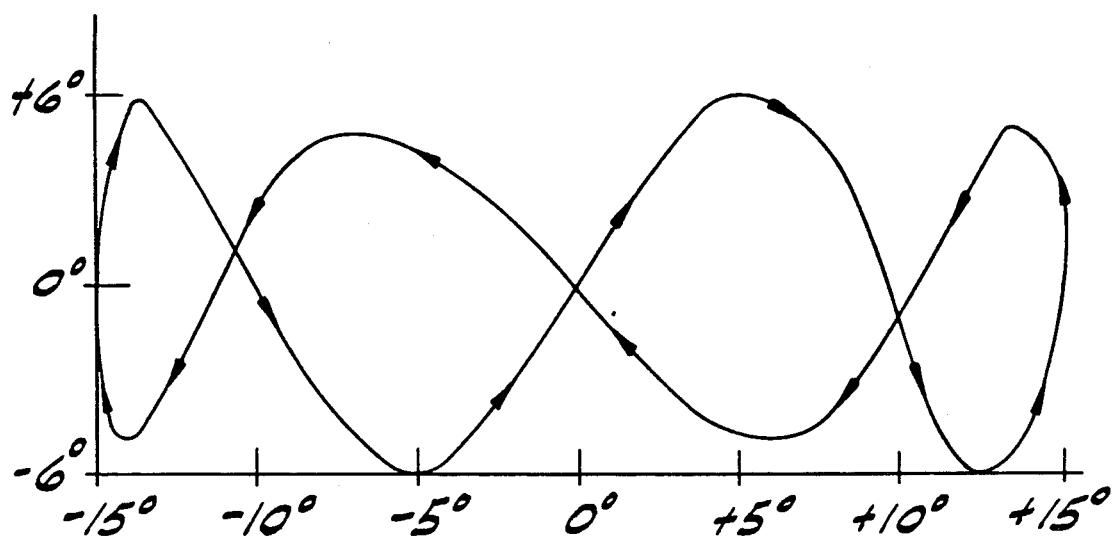
FIG. 8 is a diagram of the pattern traced by the signal light of the preferred embodiment.

FIG. 8 is a diagram of the light pattern traced by the light in the preferred embodiment. The light sweeps over a horizontal range of approximately 30°, 15° to the left of center and 15° to the right of center. The light sweeps over a vertical range of 12°, 6° above horizontal and 6° below horizontal. The pattern traced by the light is thus elongate in the horizontal direction. A notable feature of the pattern of the preferred embodiment is the substantially vertical movement of the light at the horizontal ends of the loop. Another feature of the pattern is the generally sinusoidal movement of the light as it sweeps horizontally from one side to the other. In this preferred embodiment, the pattern has at least two crests as the light moves from one side to the other. These features combine to provide substantial light coverage of the area swept by the light, without significant gaps or blind spots. The grooves 40 and 42 have been designed so that when using a parabolic reflector 36 that provides a 5° beam divergence, the signal light 20 generates a beam pattern that will cover the entire field of illumination with intense light every time the disc 38 makes a complete revolution.

Figure 9:
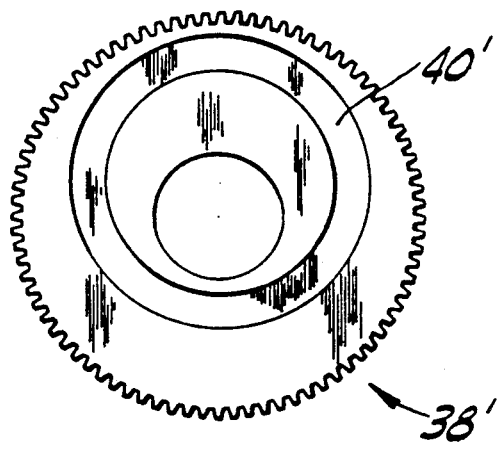
FIG. 9 is a top plan view of a second embodiment of the disc.
Figure 10:
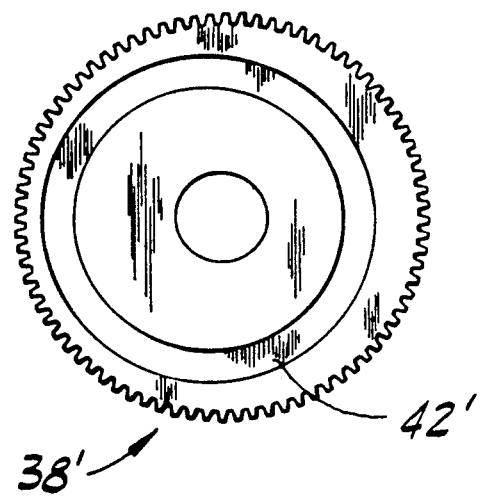
FIG. 10 is a bottom plan view of the second embodiment of the disc.
Figure 11:
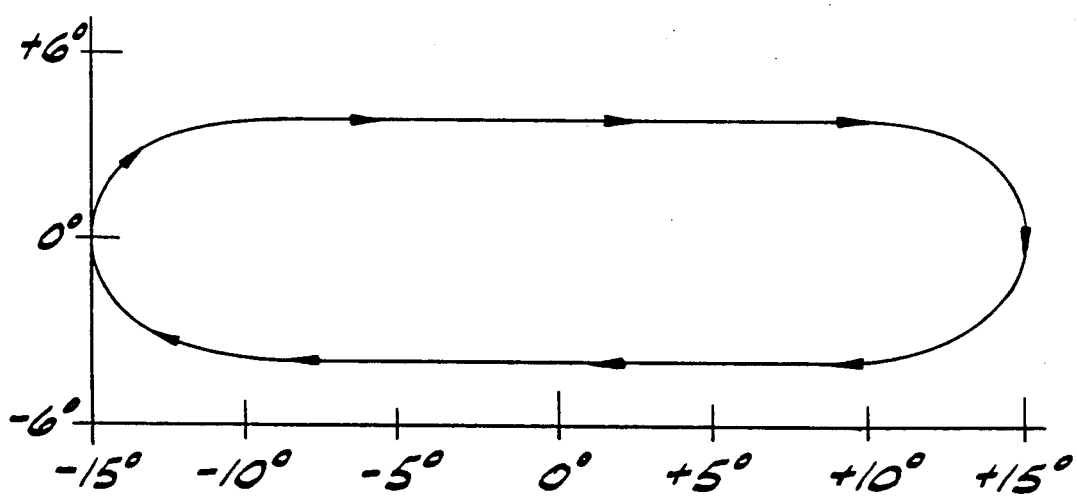
FIG. 11 is a diagram of the pattern traced by the signal light of the second embodiment.

Of course, some other pattern can be achieved by forming a new disc 38 with different grooves 40 and 42. By properly configuring the grooves 40 and 42, a wide variety of patterns can be provided both above and below the horizontal plane. The number of lobes of the pattern can also be increased or decreased. For example, a second embodiment of a disc 38' is shown in FIGS. 9 and 10. Disc 38' has grooves 40' and 42', which cause the light to sweep the pattern shown in FIG. 11.

OPERATION

In operation, the signal device might be mounted on an emergency vehicle such as a police car, fire truck, or ambulance. When the device is powered, the lamp 24 is illuminated, and the electric motor 46 is energized, driving the drive shaft 50 and turning the worm 48. As the worm turns, the disc 38 is rotated. Rotation of the disc 38 causes the grooves 40 and 42 to move. As the disc turns, the follower 56 in the groove 40 causes the link 54 to pivot in a rocking motion. The rocking of the link 54 causes the frame 26 to turn back and forth about the first axis. Also as the disc turns, the follower 62 in the groove 42 causes the bracket 28 to pivot about the second axis. The combined horizontal and vertical movement of the lamp 24 causes the light to trace the closed loop pattern shown in FIG. 8.

Of course the signal device could be used to trace some other pattern by replacing the disc 38.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A signal light comprising:
   a base;
   a light source;
   means for pivotally mounting the light source on the base to pivot about a first axis;
   means for pivotally mounting the light source to pivot about a second axis, substantially perpendicular to the first axis; and
   said means for pivoting the light source about the first and second axes, comprising:
   moving unitary cam means having a first cam surface defined therein and a second cam surface defined therein;
   means following the first cam surface for pivoting the light source about the first axis; and
   means following the second cam surface for pivoting the light source about the second axis.

2. The signal light according to claim 1 wherein the cam surfaces lie along curved paths to be followed by said means following the first cam surface and means following the second cam surface so that light traces a repeated closed loop.

3. The signal light according to claim 2 wherein the curved paths along which the cam surfaces lie are shaped so that the light traces a generally sinuous path as it pivots about the first axis.

4. The signal light according to claim 2 wherein the first axis is substantially vertical and the second axis is generally horizontal, and wherein the loop traced by the light source is elongate in the horizontal direction, and characterized by substantially vertical movement of the light at the opposite ends of the loop.

5. A signal light comprising:
   base;
   a light source;
   means for pivotally mounting the light source on the base to pivot about a first axis;
   means for pivotally mounting the light source to pivot about a second axis, substantially perpendicular to the first axis; and
   means for pivoting the light source about the first and second axes, comprising:
   a first moving cam surface;
   a second moving cam surface;
   means following the first cam surface for pivoting the light source about the first axis; and
   means following the second cam surface for pivoting the light source about the second axis; and
   a rotating disc, having the first and second moving cam surfaces on opposite sides thereof.

6. A signal light comprising:
   a base;
   a frame pivotally mounted on the base for pivoting about a first axis;
   a light source pivotally mounted in the frame for pivoting about a second axis, substantially perpendicular to the first axis;
   means for pivoting the frame about the first axis and means for pivoting the light source about the second axis so that the light source traces a repeating, closed loop pattern, the pivoting means comprising:
   moving unitary cam means having a first cam surface defined therein and a second cam surface defined therein;
   means following the first cam surface for pivoting the frame about the first axis; and
   means following the second cam surface for pivoting the light source about the second axis.

7. A signal light comprising:
   a base;
   a frame pivotally mounted on the base for pivoting about a first axis;
   a light source pivotally mounted in the frame for pivoting about a second axis; substantially perpendicular to the first axis;
   means for pivoting the frame about the first axis and means for pivoting the light source about the second axis so that the light source traces a repeating, closed loop pattern, the pivoting means comprising:
   a first moving cam surface;
   a second moving cam surface;
   means following the first cam surface for pivoting the frame about the first axis; and
   means following the second cam surface for pivoting the light source about the second axis; and
   a rotating disc, the first and second moving cam surfaces comprising grooves on opposite sides of the rotating disc.

8. The signal light according to claim 7 wherein the means for pivoting the frame about the first axis comprises a first cam follower which engages the first moving cam surface, and means for operatively connecting the first cam follower and the frame so that movement of the follower causes the frame to pivot.

9. The signal light according to claim 8 wherein the first cam follower comprises a link, pivotally mounted on the base, having a portion in engagement with the first cam surface, and wherein the means for operatively connecting the first cam follower to the frame comprises a slot in the frame, and means on the link, slidable in the slot, for pivoting the frame.

10. The signal light according to claim 6 wherein the means for pivotally mounting the light source in the frame comprises a bracket pivotally mounted in the frame.

11. The signal light according to claim 10 wherein the means for pivoting the light source about the second axis comprises a second cam follower, connected to the bracket, and adapted to follow the second cam surface.

12. A signal light comprising:
   a base;
   a frame pivotally mounted on the base for pivoting about a first axis;
   a light source pivotally mounted in the frame for pivoting about a second axis, substantially perpendicular to the first axis;
   means for pivoting the frame about the first axis and means for pivoting the light source about the second axis so that the light source traces a repeating, closed loop pattern, the pivoting means comprising:
   a first moving cam surface;
   a second moving cam surface;

means following the first cam surface for pivoting the frame about the first axis; and means following the second cam surface for pivoting the light source about the second axis; and a disc, rotatably mounted on the base, and means for rotating the disc, the first and second moving cam surfaces comprising continuous grooves in at least one side of the disc.

13. The signal light according to claim 12 wherein the first and second cam surfaces are on opposite sides of the disc.

14. A signal light comprising:

a base;

a frame pivotally mounted on the base for pivoting about a first axis;

a bracket pivotally mounted in the frame for pivoting about a second axis, substantially perpendicular to the first axis;

a light source mounted on the bracket so that it pivots with the frame and bracket about the first and second axes;

means for pivoting the frame about the first axis and means for pivoting the light source about the second axis so that the light source traces a repeating, closed loop pattern, the pivoting means comprising:

a disc;

means for rotating the disc;

first and second cam surfaces on the disc;

means following the first cam surface for pivoting the frame about the first axis; and means following the second cam surface for pivoting the bracket about the second axis.

15. The signal light according to claim 14 wherein the first and second cam surfaces comprise continuous grooves in the surface of the disc.

16. The signal light according to claim 15 wherein the first and second cam surfaces are on opposite sides of the disc.

17. The signal light according to claim 14 wherein the means for pivoting the frame about the first axis comprises a first cam follower which engages the first moving cam surface, and means for operatively connecting the first cam follower and the frame so that movement of the follower causes the frame to pivot.

18. The signal light according to claim 17 wherein the first cam follower comprises a link, pivotally mounted on the base, having a portion in engagement with the cam surface, and wherein the means for operatively connecting the first cam follower to the frame comprises a slot in the frame, and means on the link, slidable in the slot, for pivoting the frame.

19. The signal light according to claim 14 wherein the means for pivoting the bracket about the second axis comprises a second cam follower, connected to the bracket, and adapted to follow the second cam surface.

20. The signal light according to claim 14 wherein the first axis is generally vertical, and wherein the second axis is generally horizontal.

21. The signal light according to claim 20 wherein the pattern traced by the light is elongate in the horizontal direction, and wherein the movement of the light at the horizontal ends of the pattern is substantially vertical.

22. The signal light according to claim 21 wherein the movement of the light is generally sinusoidal as the light sweeps horizontally from one side to the other, the pattern having at least two crests as the light moves from one side to the other.

23. The signal light according to claim 14 wherein the movement of the light is generally a flattened oval having a first sweep above horizontal and a return sweep below horizontal.

24. A signal light comprising:

a base;

a light source;

means for pivotally mounting the light source on the base to pivot about a first axis;

means for pivotally mounting the light source to pivot about a second axis, substantially perpendicular to the first axis; and means for simultaneously pivoting the light source about the first and second axes so that light from the light source traces a repeated closed loop having the same pattern.

25. The signal light according to claim 24 wherein the first axis is substantially vertical and the second axis is substantially horizontal, and wherein the loop traced by the light source is elongate in the horizontal direction, and characterized by substantially vertical movement of the light at the opposite ends of its horizontal direction.

* * * * *